United States Patent
Vial et al.

(10) Patent No.: US 11,808,179 B2
(45) Date of Patent: Nov. 7, 2023

(54) TURBOMACHINE HOLLOW BLADE

(71) Applicant: SAFRAN HELICOPTER ENGINES, Bordes (FR)

(72) Inventors: Laurence Vial, Moissy-Cramayel (FR); Bruno Frelon, Moissy-Cramayel (FR); Jérôme Beugniez, Moissy-Cramayel (FR); Yann Bellot, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/909,143

(22) PCT Filed: Mar. 8, 2021

(86) PCT No.: PCT/FR2021/050390
§ 371 (c)(1),
(2) Date: Sep. 2, 2022

(87) PCT Pub. No.: WO2021/181038
PCT Pub. Date: Sep. 16, 2021

(65) Prior Publication Data
US 2023/0144182 A1 May 11, 2023

(30) Foreign Application Priority Data

Mar. 13, 2020 (FR) ...................................... 2002509

(51) Int. Cl.
*F01D 9/06* (2006.01)
*F01D 5/18* (2006.01)
*B33Y 80/00* (2015.01)

(52) U.S. Cl.
CPC ............. *F01D 9/065* (2013.01); *F01D 5/187* (2013.01); *B33Y 80/00* (2014.12); *F05D 2250/221* (2013.01); *F05D 2250/28* (2013.01)

(58) Field of Classification Search
CPC ................................. F01D 9/065; F01D 5/187
See application file for complete search history.

(56) References Cited

U.S. PATENT DOCUMENTS 4,422,229 A * 12/1983 Sadler ..................... F01D 5/183
164/112
7,967,568 B2 * 6/2011 Dalton .................... F01D 9/041
415/115

(Continued)

FOREIGN PATENT DOCUMENTS

EP 3015647 5/2016

OTHER PUBLICATIONS

International Patent Application No. PCT/FR2021/050390, International Search Report dated Jun. 11, 2021, 12 pages (10 pages of original document and 2 pages of English translation).

*Primary Examiner* — Eldon T Brockman
(74) *Attorney, Agent, or Firm* — Kilpatrick Townsend & Stockton LLP

(57) ABSTRACT

Turbomachine hollow blade (11) comprising at least one vane (14) having lateral walls (15) which are intended to guide a flow in a flow path around the vane and which are fixed to a first platform (12) at a first longitudinal end of the vane (14), the vane (14) further comprising an internal cavity between the lateral walls (15), which cavity is intended for passing a vane-cooling fluid, with a fluid inlet opening (19) opening through said first platform (12), characterized in that a gyroid surface network (18) fills at least part of the cavity, being arranged therein so as to guide the cooling fluid, and is in contact with at least part of the lateral walls (15).

14 Claims, 2 Drawing Sheets

(56) References Cited

U.S. PATENT DOCUMENTS

| | | | |
|---|---|---|---|
| 10,400,625 B2* | 9/2019 | Cortequisse | F01D 25/06 |
| 10,982,553 B2* | 4/2021 | Rathay | F01D 5/20 |
| 11,492,908 B2* | 11/2022 | Snider | F01D 5/186 |
| 2009/0081029 A1* | 3/2009 | Dalton | F01D 5/187 |
| | | | 415/178 |
| 2014/0014493 A1 | 1/2014 | Ryan | |
| 2014/0079540 A1 | 3/2014 | Morris et al. | |
| 2018/0187984 A1 | 7/2018 | Manzo | |
| 2020/0173291 A1* | 6/2020 | Rathay | F01D 5/20 |
| 2021/0222560 A1* | 7/2021 | Snider | F01D 5/186 |

* cited by examiner

TURBOMACHINE HOLLOW BLADE

TECHNICAL FIELD OF THE INVENTION

The invention relates to turbomachine hollow vanes, in particular the turbine stator vanes for a high-pressure turbine, which are cooled by a flow of air circulating in the inner cavities of these vanes.

TECHNICAL BACKGROUND

The prior art comprises in particular the document US-A1-2014/0079540.

A high-pressure turbine stator of a turbomachine comprises an annular row of vanes between an internal ring and an external ring forming the duct through which the air leaving the combustion chamber passes. Its structure is subjected to very high temperatures. For this reason, the vanes of the turbine stator are generally hollow and their walls, bypassed by the air of the duct heated in the combustion chamber, are cooled by an air flow circulating inside the internal cavity. According to the prior art, an insert is placed in the cavity and is pierced with holes to distribute the cooling air towards the walls of the blade of the vane. The cooling air forms a jet through each insert hole that allows to cool the wall of the vane by impacting the internal face of the wall.

Depending on the methods, a turbine stator may be manufactured as a single block or by assembling elements that comprise one or more vanes, a vane typically comprising a blade with platforms forming a segment of an internal ring and an external ring that supports them. Conventionally, the manufacturing of these elements is done by casting and machining. In particular due to the insert, this manufacture is complex and costly.

The additive manufacturing offers an interesting alternative to produce the elements of the turbine stator. In a known way, the additive manufacturing of a part is done for example by laser fusion of successive layers of a powder of the material forming the part. In particular, the additive manufacturing allows to consider more suitable shapes for the insert to better distribute the cooling, and even to optimize the shape of the blades.

However, the additive manufacturing does not allow to produce suspended portions, which is in particular the case of the insert. In order to create suspended portions, it is necessary to anticipate and place supports allowing to hold these suspended portions while the layers forming the portions of the part holding said suspended portions are produced. The supports must then be removed at the end of the manufacturing.

More generally, for the additive manufacturing, the portions referred to as suspended are also the lower surfaces of the part with respect to the direction of progress of the manufacturing layers, which make an angle of less than 30° with the plane of the manufacturing layers.

Whether it is for the insert or for the manufacture of the vane with the external and internal ring segments that support it, both types of configuration of segments referred to as suspended are generally found, which requires the use of in-process supports. This makes the additive manufacturing of a turbine stator more complex and may make it less applicable.

The purpose of the invention is to propose a new type of hollow vane that can be made by additive manufacturing by overcoming the difficulty of in-process supports.

A second purpose of the invention is to optimize the cooling of the vanes by an air flow circulating in their cavities.

SUMMARY OF THE INVENTION

To this end, the invention relates to a turbomachine hollow vane, comprising at least one blade having lateral walls which are intended to guide a flow in a duct around the vane and which are attached on a first platform at a first longitudinal end of the blade, the blade further comprising an internal cavity between the lateral walls, which cavity is intended for passing a fluid for cooling the blade, with an inlet opening for the inlet of the fluid opening through said first platform, characterised in that a gyroid surface array fills at least one portion of the cavity and is arranged to guide the cooling fluid therein and is in contact with at least one portion of the lateral walls.

The gyroid surface array, a brief description of which is given below, is a surface that separates the space into two separate channels allowing the passage of a fluid. It can therefore be arranged to guide the fluid flowing inside towards the lateral walls of the blade so as to promote the cooling.

In addition, the gyroid surface maximizes the contact surface area with the fluid while forming flow channels for the fluid that do not have tightly closed bends. This has two complementary effects on the thermal exchange function with the cooling fluid. On the one hand, a gyroid surface array made of conductive material can easily transmit the heat it pumps to the fluid by conduction on the hot lateral walls with which it is in contact. On the other hand, the shape of the channels induces a low pressure drop, which minimizes the energy that must be devoted to circulating the cooling fluid through the exchanger.

Moreover, due to its geometrical properties, the gyroid surface is self-supporting with respect to the manufacturing constraints by an additive manufacturing. The fact that the gyroid surface array is in contact at least in some locations with the walls of the blade also allows these walls to be supported during the additive manufacturing if some of their segments are in a "suspended" situation at a given time in the manufacturing process.

Moreover, the gyroid surface is formed by reproduction in the three space dimensions of an elementary cubic unit cell. Advantageously, this cubic elementary unit cell can be oriented substantially parallel to the longitudinal direction.

Advantageously, the gyroid surface array extends over the entire longitudinal extension of the blade and opens into the opening embodied in the first platform, so as to guide the flow of cooling fluid as soon as it arrives in the blade.

Alternatively, the lateral walls of the blade may be attached to a second platform, at a second longitudinal end, and the gyroid surface array may then be in abutment on the second platform, between the lateral walls.

This can be advantageous in particular to allow the support of the array and/or other elements of the blade during the phases of manufacturing by an additive method.

Advantageously, since the gyroid surface array separates the space into two separate channels through which the cooling fluid can flow, the lateral walls of the blade form a portion of the walls of said channels by intersecting the gyroid surface array.

This promotes the thermal exchanges between the fluid and the walls of the blade.

The gyroid surface array can have a homogeneous structure over the entire cavity, but other alternative design of the array are conceivable.

For example, since the gyroid surface array is formed from an elementary cubic unit cell, the size of the unit cell can evolve with the position in the cavity, for example decreasing from the centre of the cavity towards the lateral walls Also, the wall thickness of the gyroid surface can be variable, for example decreasing from the centre of the cavity towards the lateral walls.

These variants will depend on the choices of the person skilled in the art, for example to better guide the cooling fluid towards the hottest regions of the walls of the blade and/or to improve the mechanical strength of the array in the vane during operation.

The gyroid surface array may occupy all or almost all of the cavity.

According to one embodiment, the vane comprises an insert in the cavity and the gyroid surface array occupies a space located between the insert and the lateral walls of the blade.

In this embodiment, the insert may be sized to cooperate with the gyroid surface array to better distribute the cooling fluid towards the walls of the blade. Furthermore, the presence of the gyroid serves as a support for the insert in a suspended position during the additive manufacturing process.

The vane can comprise appendices such as bridges, spikes, fins, holes, in contact with the gyroid surface array, in particular for reasons of mechanical strength of said array.

Advantageously, such a vane is formed from a single part obtained by additive manufacturing.

The invention also relates to a turbomachine bladed stator, in particular a turbine stator of a high-pressure turbine, comprising a vane as previously described.

The invention also relates to a turbomachine comprising a bladed stator or vane described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
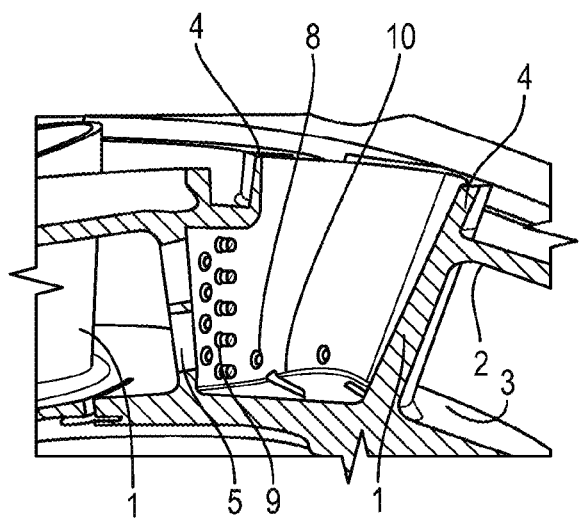
FIG. 1 is a schematic view of a cross-section according to a plane perpendicular to the axis of symmetry of a segment of turbine stator according to the prior art, without insert.
Figure 2:
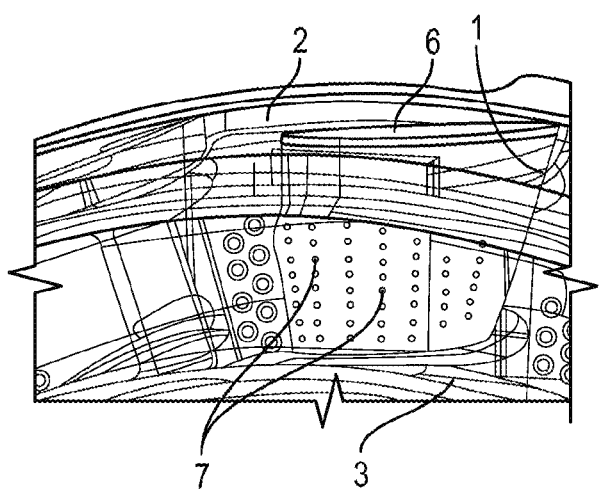
FIG. 2 is a schematic view of a segment of a turbine stator according to the prior art corresponding to that of FIG. 1, seen in transparency along the axial direction with an insert.

FIGS. 1 and 2 show a conventionally manufactured angled segment of a turbine stator. The vanes comprise hollow blades 1 manufactured from the mass with the external 2 and internal 3 ring delimiting the duct. At the connection with the external ring 2, the walls of the blade of the vane extend into a chimney 4 forming a passage for an internal cooling air flow. This air flow is evacuated through vents 5 at the trailing edge. An insert 6 following the inner shapes of the walls of the blade 1 guides the air arriving through the chimney 4 and distributes it towards the walls through holes 7 to ensure cooling. The shape of the blades 1 is quite simple here. Furthermore, we see an assembly of structures, studs 8, bridges 9 or strips 10, arranged inside the walls to position and maintain the insert 6.

Figure 3:
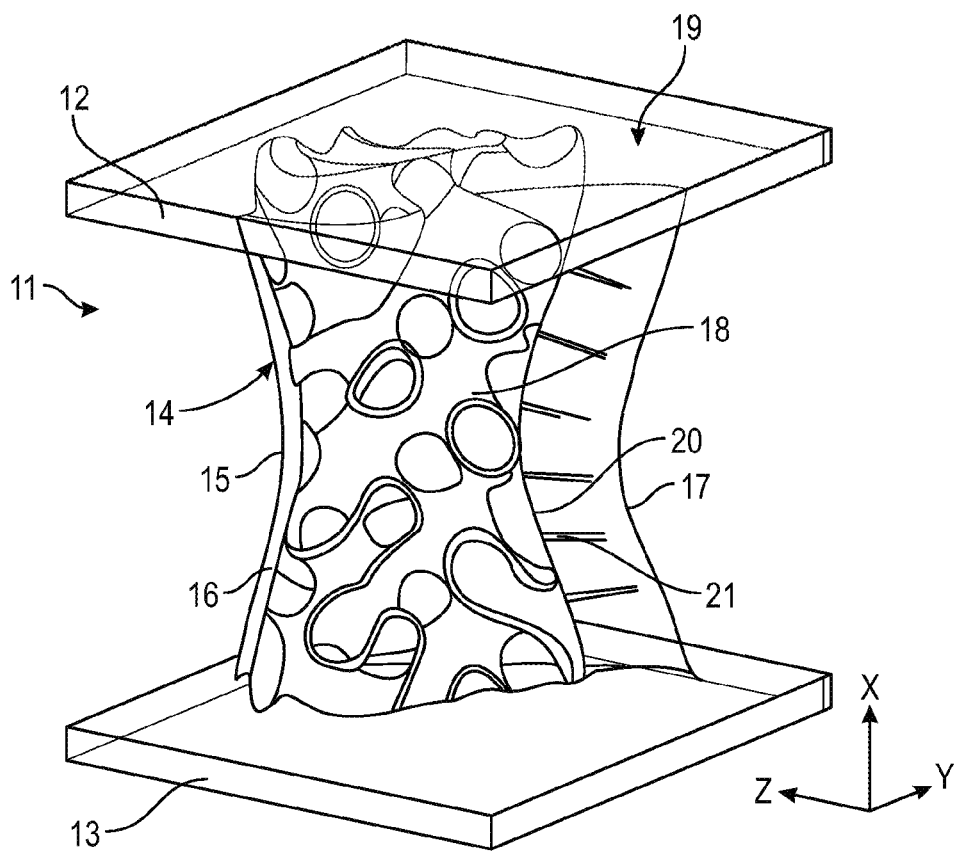
FIG. 3 is a schematic perspective view of a hollow vane according to the invention, with transparency to show the gyroid surface arranged inside the vane.

FIG. 3 shows a hollow turbine stator vane 11 according to the invention, obtained by additive manufacturing, with an external platform 12 and an internal platform 13 to which the walls 15 of the blade 14 connect. Depending on the manufacturing methods of the turbine stator, the vane 11 may comprise one blade 14, the platforms 12 and 13 of which are used to the assembling on the turbine stator or comprise one or more blades 14 connected by these platforms 12 and 13 that form a segment of the external and internal ring elements.

Here, the longitudinal direction of the blade 14 corresponds substantially to the radial direction X with respect to an axis of symmetry Z of the turbine stator. The chord of the blade 14 follows a transverse direction located in a plane defined by the axial direction Z and the tangential direction Y at the level of the blade.

Here, the walls 15 of the blade 14 form an internal cavity that opens through the external platform and extends along the entire longitudinal extent of the blade 14 between the two platforms 12 and 13. The profile of the blade 14 according to a cross-sectional plane has a curved shape. Furthermore, the blade 14 has an arcuate shape along the radial direction X. This shape is optimized for the aerodynamic performance of the turbine stator and to improve the efficiency of the high-pressure (HP) turbine to which it belongs.

The shape of the cross-sectional profile of the blade 14 makes the cavity wide near the leading edge 16 and narrow near the trailing edge 17. A gyroid surface 18 fills the internal cavity along the entire radial extent of the blade 14, between the two platforms 12 and 13.

Figure 4:
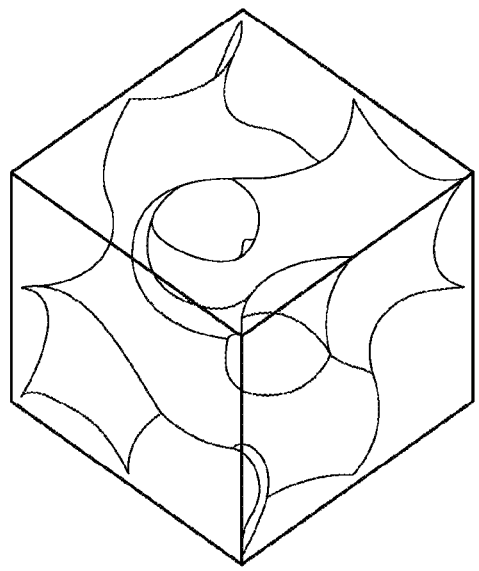
FIGS. 4 and 5 show views from two different angles of the elementary cubic unit cell of a gyroid.
Figure 5:
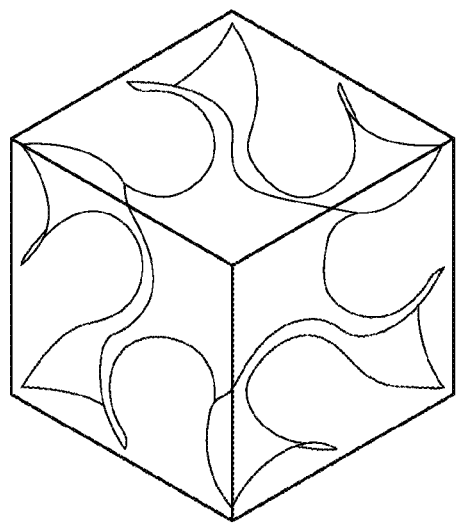

The gyroid is a minimal surface without self-intersection constructed by periodically reproducing in the three dimensions an elementary unit cell included in a cube, illustrated in FIGS. 4 and 5. The gyroid is the only non-trivial integrated member of the associated family of the Schwarz P and D surfaces with an association angle of about 38.01°. A rigorous description of the gyroid and the Schwarz P and D surfaces can be found in the document NASA TN D-5541, of May 1974, written by the scientist Alan Schoen. The surface representing the gyroid in FIGS. 4 and 5 has been plotted, with good accuracy, using a trigonometric approximation given by a short equation:

$$\sin x \cos y + \sin y \cos z + \sin z \cos x = 0 \qquad \text{[MATH.1]}$$

The gyroid separates the space into two labyrinths of opposite passages. Channels run through the gyroid labyrinths in two directions and passages emerge at angles of 70.5 degrees with respect to a given channel when it is crossed on one of the faces of the cube. As can be seen more easily in FIGS. 3 and 6, the orifices of the channels along cutting planes parallel to the sides of the elementary unit cells are very close to a circular shape.

The inclination of the walls of the gyroid, which remains globally greater to the angle of 30° at the intersections with the walls of the cube of the elementary unit cell, allows an additive manufacturing layer by layer by starting from a plane parallel to a face of the cube of the elementary unit cell.

In the example of FIG. 3, the gyroid surface 18 is constructed by reproducing, in a homogeneous manner in the whole cavity of the blade 14, an elementary unit cell with the same size. The gyroid surface 18 contacts the surface of the internal platform 13, which closes the cavity at its intersection with the walls 15 of the blade 14, and extends to the opening 19 of the cavity in the external platform 12 for supplying cooling air.

Laterally, the gyroid surface 18 contacts the internal surfaces of the walls 15 of the blade 14, from the leading edge 16 to a region near the trailing edge 17. In fact, the gyroid surface 18 stops, following the chord of the blade 14, at a point where the profile of the blade 14 becomes very thin. In the radial direction X, this determines a line 20 in the vicinity of the trailing edge 17.

In this region, fins 21 oriented substantially transversely connect the gyroid surface 18 to the walls 15 of the blade 14.

The gyroid surface 18 in the example in FIG. 3 is sized to perform several functions.

First, it ensures the manufacturability of the vane 11 by an additive method by self-supporting it during the manufacturing of successive layers. First, as previously mentioned, the gyroid surface 18 can itself be additively manufactured due to its geometric properties. Thus, this structure can be manufactured within the vane 11 without the need for dedicated manufacture supports that would be difficult to eliminate when the vane is complete. In addition, if the vane is given somewhat complex shapes or if the vane 11 comprises several blades 14 distributed over a ring element, some portions of the walls 15 may have an internal surface locating in a suspended position, with an excessive inclination with respect to the planes of the successive manufacturing layers. The gyroid surface 18 then forms a support for such wall segments of a blade of the vane.

Second, the gyroid surface 18 forms a thermal exchanger guiding a cooling fluid passing through the cavity. With reference to FIG. 3, the cooling fluid enters into the cavity through the opening 19 embodied in the external platform 12 and escapes through vents, not shown, at the level of the trailing edge 17. As briefly described, the gyroid surface 18 separates the space of the cavity into two distinct channels. Each of these channels has an inlet at the level of the opening 19 in the external platform 12. The cooling air flow is therefore separated in two and enters each of the channels through this inlet. It then follows a complex path in each channel along the entire longitudinal extension of the blade 14. As can be seen in FIG. 3, by intersecting the gyroid surface 18 the walls 15 of the blade 14 themselves form a portion of the walls of said channels. Since the gyroid surface 18 stops at a distance from the trailing edge 17, both channels have an outlet at the level of the trailing edge 17. The cooling air exits through this outlet and is guided towards the vents of the trailing edge 17.

From a thermal exchange performance standpoint, the gyroid surface 18 has a first effect in guiding the air flow towards the internal surfaces of the walls 15 of the blade 14. The air flow cools the walls 15 by convection, alongside them. Second, the gyroid surface 18 maximizes the exchange surface area with the cooling air flow. Preferably, the gyroid surface 18 is manufactured of a thermally conductive metallic material similar to that of the walls 15 of the blade 14. Being in contact with the walls 15, the gyroid surface 18 thus itself forms a radiator that pumps the heat from the walls 15 to evacuate it into the cooling air flow.

According to another point of view, the gyroid surface affects the performance in terms of pressure drop for the cooling air flow. To minimize the pressure drop, the person skilled in the art can play on the ratio between the size of the elementary unit cell and the wall thickness of the gyroid surface 18.

Furthermore, the design of the gyroid surface 18 must take into account its mechanical strength in the vane 11 during operation. For this the person skilled in the art will also adjust the ratio between the size of the elementary unit cell and the wall thickness of the gyroid surface 18. It will also define connection fillets at the intersections with the walls 15 and design worked shapes for mechanical strength to ensure the durability of the installation of the gyroid surface 18 inside the vane 11. The fins 21 shown in FIG. 3 are part of these structures.

In order to optimize the above mentioned performances or constraints, variants of embodiments can be considered.

Figure 6:
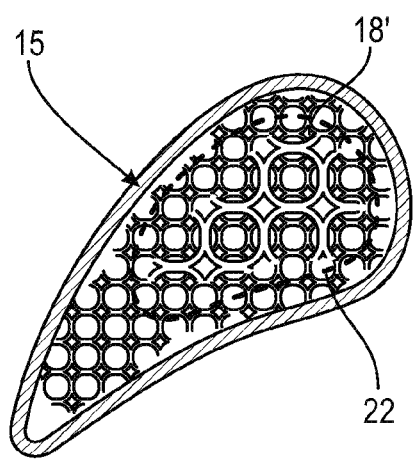
FIG. 6 shows schematically a cross-section of a variant of the vane according to the invention.

With reference to FIG. 6, the size of the unit cell can be scalable along the different directions of space in the cavity. In this case, in FIG. 6, the size of the unit cell of the gyroid surface 18' is large in the centre of the cavity and decreases as one approaches the walls 15 of the blade 14. The size of the unit cell can be judged by the size of the near-circular openings formed by the gyroid surface 18' in the cross-sectional plane. This configuration allows in particular to define for each of the two channels a central passage of large diameter through which the cooling air flow can easily cross the blade in the radial direction X before diffusing towards the walls 15 through the small unit cells over the whole longitudinal extension of the blade. This allows for better control of the distribution of the cooling air along the longitudinal extension of the blade 14 to cool the areas exposed to the hottest air in the duct.

In FIG. 6, the wall thickness of the gyroid surface also varies by decreasing from the centre towards the walls. Here, in the area 22 indicated by the dashed hoop, the thickness is greatest around the large openings. Mechanical strength considerations for large unit cells are taken into account, as well as the optimization of the thermal exchange near the walls 15, to adjust the thickness of the gyroid surface.

Figure 7:
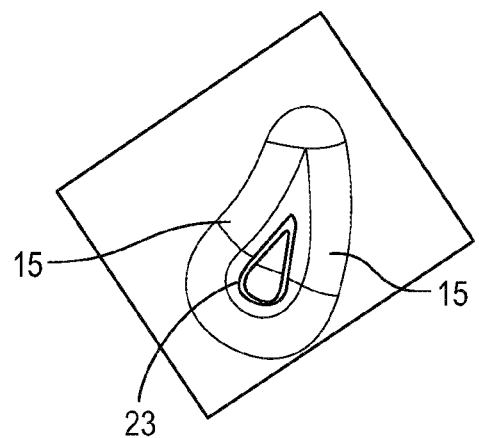
FIG. 7 shows schematically another variant of the blade according to the invention, cut according to a transverse plane, without the gyroid surface which would be arranged there.

Referring to FIG. 7, an insert 23 is inserted into the cavity between the walls 15. In this case, the gyroid surface, not shown in the figure, fills the space defined between the internal surfaces of the walls 15 and the external surface of the insert 23. Advantageously, the insert 23 is hollow and opens into the external platform 12. It is then equipped with openings, not shown, through its walls along its longitudinal extension in the cavity. These openings open into the channels of the gyroid surface. The insert 23 is then sized to distribute over the longitudinal extension of the blade 14 an air flow supplying the channels of the gyroid. The insert 23 then functions much like the unit cells with larger size in the previous variant. It will be further noted that the presence of the gyroid surface allows for the design of complex insert 23 shapes without adversely affecting the manufacturability by an additive method, since this gyroid surface will ensure the support for the insert 23.

The examples shown are not limitative. Other variants combining the variations in size of unit cell and wall thickness of the gyroid surface, as well as in the shape or function of any associated insert, are covered by the invention.

The invention claimed is:

1. A turbomachine hollow vane, comprising at least one blade having lateral walls which are intended to guide a flow in a duct around the vane and which are attached on a first platform at a first longitudinal end of the at least one blade, the at least one blade further comprising:
    an internal cavity between the lateral walls, the internal cavity is intended for passing a cooling fluid of the at least one blade,
    an opening for an inlet of the cooling fluid opening through said first platform,
    characterised in that a gyroid surface array fills at least one portion of the internal cavity and is arranged to guide the cooling fluid into the internal cavity, and the gyroid surface array is in contact with at least one portion of the lateral walls.

2. The vane according to claim 1, characterised in that the gyroid surface array extends over the entire longitudinal extension of the at least one blade and opens into the opening embodied in the first platform, so as to guide the flow of cooling fluid as soon as the cooling fluid arrives on the at least one blade.

3. The vane according to claim 1, characterised in that the lateral walls of the at least one blade are attached to a second platform, at a second longitudinal end, and in that the gyroid surface array is in abutment on the second platform, between the lateral walls.

4. The vane according to claim 1, characterised in that the gyroid surface array separating a space of the internal cavity into two separate channels through which the cooling fluid can flow, the lateral walls of the at least one blade form a portion of walls of said two separate channels by intersecting the gyroid surface array.

5. The vane according to claim 1, characterised in that, the gyroid surface array being formed from an elementary cubic unit cell, the size of the unit cell evolves as a function of the position in the cavity by decreasing from the centre of the cavity towards the lateral walls.

6. The vane according to claim 1, characterised in that the wall thickness of the gyroid surface is variable by decreasing from the centre of the cavity towards the lateral walls.

7. The vane according to claim 1 further comprising an insert in the cavity and that the gyroid surface array occupies a space located between the insert and the lateral walls of the at least one blade.

8. The vane according to claim 1 is formed of a single part obtained by additive manufacturing.

9. The vane according to claim 1, characterised in that the vane comprises at least one of bridges, spikes, fins, or holes in contact with the gyroid surface array.

10. A turbomachine bladed stator comprising a vane according to claim 1.

11. The turbomachine bladed stator according to claim 10, wherein the turbomachine bladed stator is a high-pressure turbine stator.

12. A turbomachine comprising a vane according to claim 10 or claim 11.

13. A turbomachine hollow vane, comprising at least one blade having lateral walls which are intended to guide a flow in a duct around the vane and which are attached on a first platform at a first longitudinal end of the at least one blade, the at least one blade further comprising an internal cavity between the lateral walls, the internal cavity is intended for passing a cooling fluid of the at least one blade, with an opening for an inlet of the cooling fluid opening through said first platform, characterised in that a gyroid surface array fills at least one portion of the internal cavity and is arranged to guide the cooling fluid therein and is in contact with at least one portion of the lateral walls,
    wherein the gyroid surface array separating a space of the internal cavity into two separate channels through which the cooling fluid can flow, the lateral walls of the at least one blade form a portion of walls of said two separate channels by intersecting the gyroid surface array.

14. A turbomachine hollow vane, comprising at least one blade having lateral walls which are intended to guide a flow in a duct around the vane and which are attached on a first platform at a first longitudinal end of the at least one blade, the at least one blade further comprising an internal cavity between the lateral walls, the internal cavity is intended for passing a cooling fluid of the at least one blade, with an opening for an inlet of the cooling fluid opening through said first platform, characterised in that a gyroid surface array fills at least one portion of the internal cavity and is arranged to guide the cooling fluid therein and is in contact with at least one portion of the lateral walls,
    wherein the vane comprises an insert in the cavity and that the gyroid surface array occupies a space located between the insert and the lateral walls of the at least one blade.

* * * * *